Aug. 27, 1963   J. T. McNANEY   3,102,162
IMAGE PROJECTION SYSTEM
Filed Feb. 14, 1958
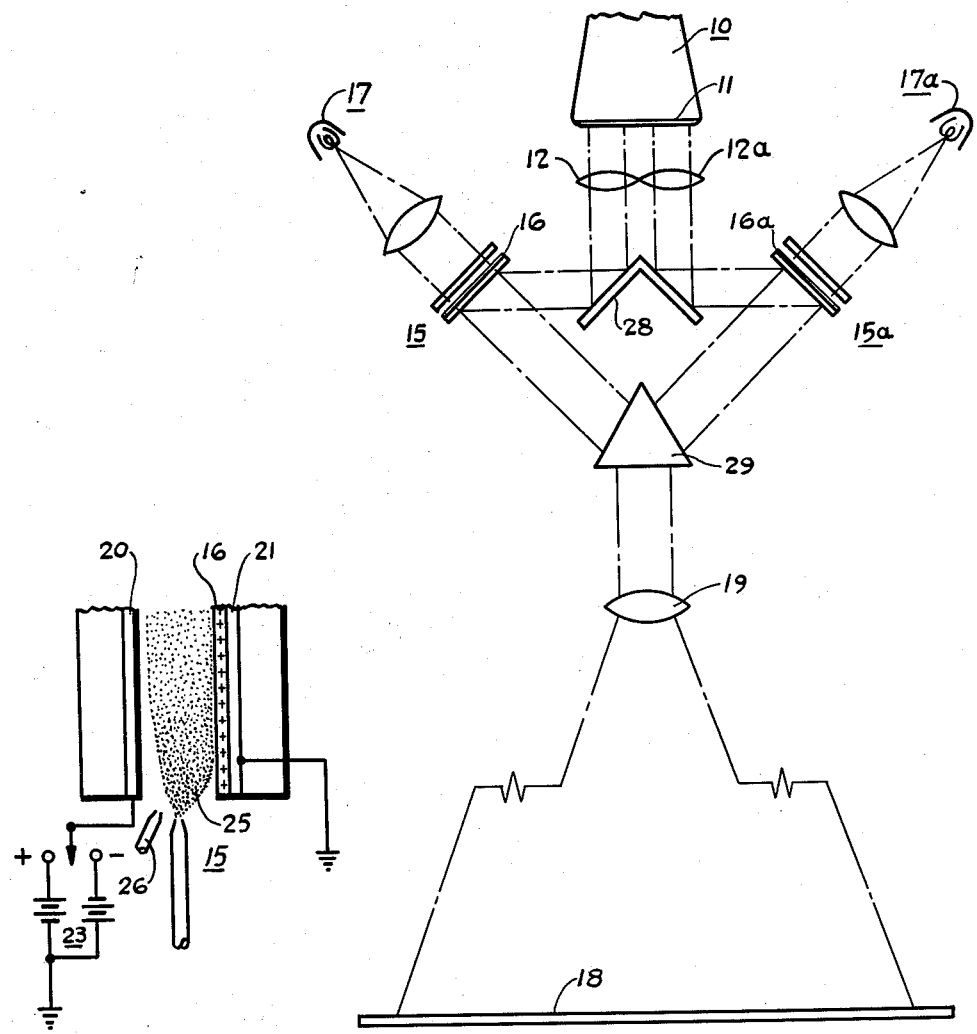
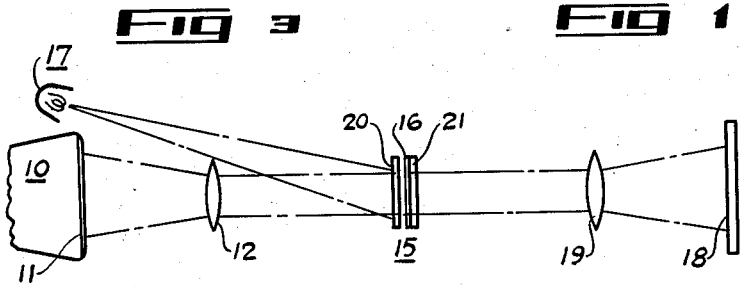
INVENTOR.
JOSEPH T. McNANEY.
BY
*Egon W. Mueller*
ATTORNEY.

3,102,162

IMAGE PROJECTION SYSTEM
Joseph T. McNaney, La Mesa, Calif., assignor to General Dynamics Corporation, Rochester, N.Y., a corporation of Delaware
Filed Feb. 14, 1958, Ser. No. 715,323
8 Claims. (Cl. 178—6.6)

This invention relates generally to a system capable of projecting amplified light images upon a screen.

There are numerous applications in which information is presented in the form of light rays, for example upon the screen of a cathode ray tube, when it is desired to view that information image as rapidly as possible upon a large independent viewing screen. Present day devices capable of carrying out such an operation many utilize photographic films to photograph data or light images, presented on the face of a cathode ray tube for instance, and through the utilization of rapid photographic processing techniques, process the image reproduction at a 5–8 minute cycle. The processed image reproduction is then presented to a projector, light projected therethrough and an enlarged visual image is presented to the screen for viewing. Techniques utilizing the general photographic approach to projection of the aforestated light images, often break down in rapid processing of the photographic films. Further, it is the processing which is most time consuming and the greatest contributor in delaying the eventual projection of the images upon the screen. It being understood that it is necessary in the aforestated prior art devices to utilize film exposing the film a predetermined amount of time to the light images, then transporting the exposed film from the point of exposure to another position, where the developing, fixing and washing of the exposed film takes place. Of course, developing, fixing and washing itself may require several transport stages. Thereafter, the film is transported to another position where light is projected through the film to present the visual image of the photographed light image upon the screen.

As is readily apparent from the aforedescribed operation, it is time consuming, requires expertise in the handling of fluids in very short periods of time, as well as complex transport mechanisms to rapidly handle the film without damage. Breakdown in any of the numerous aforestated stages, stops the entire process. Reliability is an important problem to be solved by simplification and removal of moving parts.

It is the intent of the present invention to overcome the aforestated difficulties and substantially eliminate moving parts and mechanisms from the operation. The present invention envisages utilization of electrostatic recordation of the light images, presented by a cathode ray tube for example, developing of the electrostatic charge patterns and projecting the developed patterns optically onto a screen for viewing. The inventive mechanism and method is limited only by the adequate exposure of a photoconductive layer and the development of the image upon that layer with electrostatically attractable material. The moving parts are practically eliminated and reside chiefly in movement of the electrostatically attractable material to develop the image. It is not necessary to utilize transport mechanisms or have other parts of the disclosed invention physically move or be transported from one place to another. The inventive system clearly overcomes the disadvantages inherent in the aforedescribed prior art and is a great improvement thereof.

It is an object of the present invention to provide a substantially inertia free system for projecting light images from a source upon a screen for visual observation.

It is another object of the present invention to provide a new and improved projection system substantially free from moving parts.

It is another object of the invention to provide a system capable of projecting light images in the form of a visual display upon a screen that is simple in construction and substantially trouble free in operation.

Objects and advantages other than those set forth above will be apparent when read in connection with the specification and accompanying drawings, in which:

FIGURE 1 is a diagrammatic view embodying the inventive projection system;

FIGURE 2 is a simplified schematic view of the invention;

FIGURE 3 is an enlarged partial view of the light to visual image conversion means as schematically shown in FIGURES 1 and 2.

Adverting to FIGURE 1, there is shown a preferred embodiment of the invention. A cathode ray tube 10 (partially shown) is provided with a phosphorescent screen 11. Screen 11 may be used as the source of the light images to be presented by the system. It should be understood that any known devices generating light images could be used as the source for the light images. However, the cathode ray tube, as symbolically shown, exemplifies one source to originate the light images. The exemplified embodiment using the cathode ray tube 10 follows customary practice in present day computing output devices, as well as radar systems where cathode ray tubes present light image output as light images, which images, in turn, are presented upon large screens for viewing of an evaluating audience. The cathode ray tube exemplified may be of a type shown in Patent No. 2,736,770.

While FIGURE 1 shows a preferred embodiment of an overall projection system, FIGURE 2 shows the rudimentary aspects of the invention. The light image may, for example, be projected from screen 11, as light and shadow, through a lens 12 onto a light to visual image conversion means 15. The light image is recorded as an electrostatic charge pattern, either negative or positive as desired, upon a photoconductive layer 16 of the conversion means 15. It should be understood, of course, that the photoconductive layer may be charged either positively thereby creating positive images, or negatively thereby creating negative images. Light illumination from a light source may then be projected through the conversion means 15 to illuminate the charge pattern presented by the photoconductive layer 16. The resulting illumination of the charge pattern is focused onto a light responsive viewing screen 18 by lens 19, presenting a visual image upon the viewing screen 18 of the light image from screen 11. Lens 19 may be of a type to effect enlargement of the visual images upon the screen 18.

The simplicity of the light to visual image conversion means 15, also treated herein as the means responding to the images for electrostatically recording corresponding charge patterns (which means may be selectively transparent to light), aids materially in the operation of the invention. The means 15 is shown in greater detail for purposes of clarity in FIGURE 3. Means 15 includes a pair of spaced apart transparent conductors 20, 21. Conductors 20, 21 may be for example, "Nesa" conductive glass, or thin conductive layers disposed upon glass, the entire assembly being transparent to light rays. One of the transparent conductors 20, as exemplified, may be positioned intermediate the other conductor 21 and the light source 17. This positioning is not, however, a limitation as either conductor may face the source 17. It is understood, of course, that the means 15 must, of necessity, be disposed in the path of both the light images from the screen 11 and the light illumination from the light source 17. Adverting to FIGURE 3, for a more detailed examination of the means 15, we have shown a portion of the conductor 20 connected selectively to a positive or negative voltage source 23. The conductor 21 is spaced apart from, but adjacent conductor 20. Upon its surface, facing conductor 20, is disposed a layer of photoconductive material 16. The photoconductive material may be any of the well known photoconductive materials capable of responding to light to make conductive the material normally non-conductive in the dark or absence of light. Materials which can be made conductive by illumination to light, include selenium, cadmium sulfide, silver selenide, germanium and like materials all well known in the art.

Conductor 21 is connected through ground with the voltage source 23. The principal use of conductor 20 is to effect a desired substantially uniform electrostatic charge upon photoconductive layer 16, creating thereon either a positive or negative charge as selected. It should be understood, of course, that either negative or positive photoconductive charges may be created upon the photoconductive layer 16. Upon illumination of the photoconductive layer by the light images, either corresponding areas illuminated surrounding areas will be discharged to ground depending upon whether or not the photoconductive layer is positively or negatively charged with respect to the voltage source 23. Having reacted to the light images, the photoconductive layer 16 may then have the resulting charge pattern of the light image developed by electrostatically attractable means 25. Means 25, such as powder or charged droplets or liquid dispersions of powder, may be provided appropriate charges to be attracted to an oppositely charged charge pattern upon layer 16. The electrostatically attractable means 25 will effect development of the corresponding charge patterns upon layer 16 into visual images either positive or negative depending upon the charge of the pattern upon the layer 16. After the visual image created on layer 16 is projected through the illumination by the light source 17 onto the screen 18, the image created by the charge pattern on layer 16 may be removed by a blast of air, if desired, from jet 26, thereby readying the layer for the next charge and reception of the next light image thereupon. Of course, the attractable means 25 may be removed by brushes, wiping or reversal of charges and the like, the removal stated being exemplary only and not limiting.

Adverting to the preferred embodiment, as shown in FIGURE 1, the entire process of presenting light images upon a screen may be accelerated through the duplexing of information upon the tube screen 11 through alternately presenting first and second images upon the tube screen 11, and, acting upon them sequentially. Upon presentation of the first images upon screen 11, lens 12 will image that first part of the information as light images from the tube screen 11 upon a two-sided angular reflective device, such as a mirror 28, which will reflect the light image onto the photoconductive layer 16 of the means 15. The image will there be developed as previously discussed in conjunction with FIGURE 3 and, appropriately illuminated by light source 17 onto the face of a prism 29, for example. Prism 29 may redirect the alternately presented illuminated visual images along a common path toward screen 18. The image so redirected through the prism is presented to lens 19 for enlargement, if desired, and presentation onto the surface of the light responsive screen 18 for visual observation by viewers. During the processing of the first images, such as development in means 15 and presentation of the final image upon the screen through the first path, the second images of the information are presented on screen 11. The second part of the information is imaged from tube screen 11 by a lens 12a to another side of the angular mirror 28, which, in turn, presents the light image to the photoconductive layer 16a of means 15a. As that second image is then developed, and upon the completion of the viewing of the first projected image, light from light source 17a illuminates the visual image upon photoconductive layer 16a projecting the same onto and through prism 29 for presentation in turn by the prism 29 to lens 19. Lens 19 images the visual image onto screen 18 for viewing.

It should be understood that the duplexing system as herein described is exemplary, and may, through the utilization of modifications of the optics shown herein, be further extended to not only duplex, but triplex or more, if desired, all to more quickly and adequately present the light images from the tube screen 11 in final form for viewing upon the screen 18.

The particular embodiments of the invention illustrated and described herein are illustrative only and the invention includes such other modifications and equivalents as may readily appear to those skilled in the art, within the scope of the appended claims.

I claim:

1. The combination comprising: a photoconductive sheet; means for producing a uniform electrical charge on said sheet; means for causing light to convert said uniform electrical charge to a charge pattern; means for converting said charge pattern on said photoconductive sheet to a pattern of light and dark areas; and means for projecting said light and dark areas on said photoconductive sheet onto a viewing screen.

2. The combination comprising: a photoconductive sheet; means for producing a uniform electrical charge on said sheet; means for causing light to convert said uniform electrical charge to a charge pattern; means for converting said charge pattern on said photoconductive sheet to a pattern of light and dark areas; and means for projecting light through said light and dark areas on said photoconductive sheet onto a viewing screen.

3. The combination comprising: a fixedly positioned element having a photoconductive coating on one surface thereof; means for producing a uniform electrical charge on said coating; means for causing light to convert said uniform electrical charge to a charge pattern; means for converting said charge pattern on said photoconductive coating to a pattern of light and dark areas; and means for projecting said light and dark areas on said photoconductive coating onto a viewing screen.

4. The combination comprising: a cathode ray tube having means for producing a picture on its faceplate; a storage element, having a photoconductive coating on one surface thereof, fixedly positioned in front of said faceplate; means for producing a uniform electrical charge on said coating; means for causing light from said picture to convert said uniform electrical charge to a charge pattern on said photoconductive coating; means for converting said charge pattern to a pattern of light and dark areas on said photoconductive coating; and means for projecting said light and dark areas onto a viewing screen.

5. Display apparatus comprising: means for producing a picture; a pair of fixedly positioned transparent support members; a transparent conductive layer positioned on each member of said pair; a photoconductive coating positioned on one of said conductive layers; means for producing a uniform electrical charge on said photoconductive coating, said means comprising an electrical field established between said conductive layers; means for converting said uniform charge to a charge pattern on said photoconductive coating corresponding to said picture; means for converting said charge pattern to light and dark areas on said photoconductive coating, said means comprising means for causing dark particles to adhere selectively to said charge patterns; means for projecting light through said transparent support members to produce a display on a viewing screen.

6. Display producing apparatus comprising: means for producing successive pictures; a plurality of pairs of fixedly positioned transparent support members; a transparent conductive layer positioned on one said member of each said pairs; a first source of potential connected to said conductive layers; a second transparent conductive layer positioned on the other said member of each said pairs; a second source of potential connected to said second conductive layers; a photoconductive coating positioned on the conductive layers of one of said members; means producing a uniform electrical charge on said photoconductive coatings, said means comprising the electrical field established between said conductive layers by said sources; means for converting said uniform charge on successive said coating to a charge pattern corresponding to said successive pictures; means for converting said charge patterns to light and dark areas; and means for projecting light through said transparent support members—whereby said light and dark areas produce a display on a viewing screen.

7. A cathode ray tube having means for producing sequential pictures on its faceplate; a plurality of pairs of fixedly positioned transparent support members; a transparent conductive layer positioned on one said member of each said pairs; first sources of potential connected to respective said conductive layers; a second transparent conductive layer positioned on the other said member of each said pairs; second sources of potential connected to respective said second conductive layers; a photoconductive coating positioned on each said second conductive layer; means for producing a uniform electrical charge on each said photoconductive coatings, said means comprising an electrical field established between said members of said pairs by said first and said second sources of potential; means for sequentially converting said uniform charge on sequential said coating to charge patterns corresponding to sequential pictures on said faceplate of said cathode ray tube; means for converting said charge patterns to light and dark areas, said means comprising means for causing dark particles to adhere selectively to said charge patterns; and means for projecting light through said light and dark areas onto a viewing screen.

8. The combination comprising means including a photoconductive sheet for converting light patterns impinging thereon to corresponding electrostatic patterns on said photoconductive sheet, means for developing said charge patterns on said photoconductive sheet to provide visual patterns and means for projecting said developed patterns on said photoconductive sheet onto a viewing screen.

References Cited in the file of this patent

UNITED STATES PATENTS

| | | |
|---|---|---|
| 1,808,137 | Hartley | June 2, 1931 |
| 2,185,379 | Myers | Jan. 2, 1940 |
| 2,212,249 | Schroter | Aug. 20, 1940 |
| 2,297,691 | Carlson | Oct. 6, 1942 |
| 2,566,713 | Zworykin | Sept. 4, 1951 |
| 2,605,352 | Fischer | July 29, 1952 |
| 2,848,533 | Burr | Aug. 19, 1958 |
| 2,890,633 | Huebner | June 16, 1959 |